US005916343A

United States Patent [19]

Huang et al.

[11] Patent Number: 5,916,343

[45] Date of Patent: Jun. 29, 1999

[54] THERMO-SHRINKING FILM CUTTING MECHANISM FOR A LABELING MACHINE

[76] Inventors: Fu-Chuan Huang, No. 111-11, Chung Chuang Tsun, Shui Shang Hsiang, Chia I Hsien; Chien-Tsai Huang, No. 146, SEC: 1, Chung Shan E. Rd. .; Chin-Tsai Wu, 2 Fl., No. 4, Lane 90, Chang Chiang Rd., both of Chung Li City, Tao Yuan Hsien, all of Taiwan

[21] Appl. No.: 09/081,597

[22] Filed: May 21, 1998

[51] Int. Cl.[6] ...... B23B 27/08

[52] U.S. Cl. ...... 82/59; 82/113; 82/130; 82/131; 83/647.5; 83/924

[58] Field of Search ...... 82/46, 101, 113, 82/130, 131, 59, 70.1, 70.2, 83; 83/875, 876, 877, 878, 54, 337, 924

[56] References Cited

U.S. PATENT DOCUMENTS

| | | | |
|---|---|---|---|
| 3,128,659 | 4/1964 | Judelson | 82/46 |
| 3,218,894 | 11/1965 | Chow | 82/101 |
| 3,323,399 | 6/1967 | Gerstein et al. | 82/101 |
| 3,324,750 | 6/1967 | Taverna | 82/101 X |
| 4,748,881 | 6/1988 | Keeling | 82/49 |
| 5,531,858 | 7/1996 | Hong | 156/556 |

*Primary Examiner*—Rinaldi I. Rada
*Assistant Examiner*—Ana Luna
*Attorney, Agent, or Firm*—Varndell Legal Group

[57] ABSTRACT

A thermo-shrinking film cutting mechanism used in a labeling machine, including a plurality of cutter units mounted on locating frames and equiangularly spaced around a center guide shaft, each cutter unit including a crank shaft, axle bearings, a coupling plate, an index plate, a locating plate, a cutter holder, a cutter blade and a clamping plate, a transmission mechanism driven to rotate said cutter units, causing said cutter units to cut a thermo-shrinking film, the transmission mechanism including a transmission disk having a plurality of receiving holes, which hold a respective axle bearing, which supports the eccentric upper section of one crank shaft, enabling the crank shafts of the cutter units to be rotated synchronously when the crank shaft of one cutter unit is rotated by a transmission belt through a transmission wheel, the cutter holder being slidably mounted in a transverse bottom groove on the locating plate and fixed in place by an adjustment screw to hold the respective cutter blade at the desired position.

3 Claims, 10 Drawing Sheets

THERMO-SHRINKING FILM CUTTING MECHANISM FOR A LABELING MACHINE

BACKGROUND OF THE INVENTION

The present invention relates to thermo-shrinking film labeling machines, and more specifically to a thermo-shrinking film cutting mechanism for a labeling machine.

In regular thermo-shrinking film labeling machines, a single or multiple rotary cutter means are used to cut the thermo-shrinking film. FIG. 1 shows the arrangement of the rotary cutter means in a thermo-shrinking film labeling machine according to the prior art. As illustrated, a plurality of rotary cutter holders C2 are equiangularly arranged around a center guide shaft C1, each cutter holder C2 holding a cutter blade C3, which is aimed at an annular groove C4 around the periphery of the center guide shaft C1, a motor C5 is driven to turn the cutter holders C2 through toothed transmission belts C6;C7. The cutter holders C2 each have a gear meshed with the toothed transmission belt C7. When the motor C5 is started, the cutter holders C2 are synchronously rotated to move the respective cutter blades C3 over the annular groove C4 on the center guide shaft C1, so as to cut off the thermo-shrinking film. When finishing one cutting operation, the cutter holders C2 must be synchronously rotated through 360° and then set in position. However, because the cutter holders C2 are driven to rotate by the toothed transmission belt C7, vibrations occur when the toothed transmission belt C7 start to wear. Because the toothed transmission belt C7 wears quickly with use, a compensating measure must be taken. In order to eliminate this problem, an idle wheel C8 is installed and peripherally pressed against the toothed transmission belt C7 to keep the toothed transmission belt C7 in positive engagement with the gears of the cutter holders C2. Furthermore, because the cutter holders C2 are linked to one another through the toothed transmission belt C7, they are rotated synchronously when one cutter holder C2 is moved. Therefore, the user's hands tend to be injured by the cutter blade C3 of an adjacent cutter holder C2 when adjusting the position of the cutter blade C3 of a particular cutter holder C2.

SUMMARY OF THE INVENTION

According to one aspect of the present invention, the thermo-shrinking film cutting mechanism comprises a plurality of cutter units mounted on locating frames and equiangularly spaced around a center guide shaft, each cutter unit comprised of a crank shaft, axle bearings, a coupling plate, an index plate, a locating plate, a cutter holder, a cutter blade and a clamping plate, a transmission mechanism driven to rotate said cutter units, causing said cutter units to cut a thermo-shrinking film, the transmission mechanism including a transmission disk having a plurality of receiving holes, which hold a respective axle bearing, which supports the eccentric upper section of one crank shaft, enabling the crank shafts of the cutter units to be rotated synchronously when the crank shaft of one cutter unit is rotated by a transmission belt through a transmission wheel. According to another aspect of the present invention, the cutter holder is slidably mounted in a transverse bottom groove on the locating plate and fixed in place by an adjustment screw to hold the respective cutter blade at the desired position.

DETAILED DESCRIPTION OF THE PREFERRED EMBODIMENT

Figure 1:
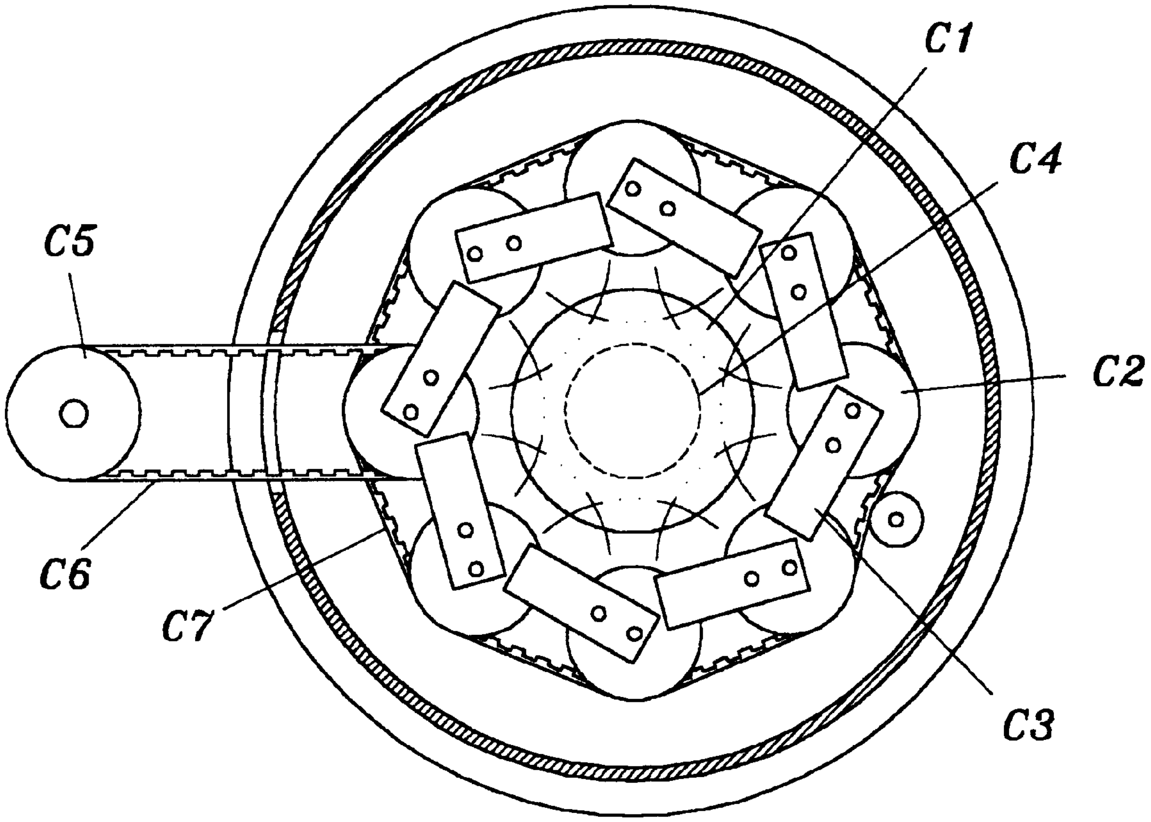
FIG. 1 PRIOR ART
FIG. 1 is a top plain view of a thermo-shrinking film cutting mechanism according to the prior art.
Figure 2:
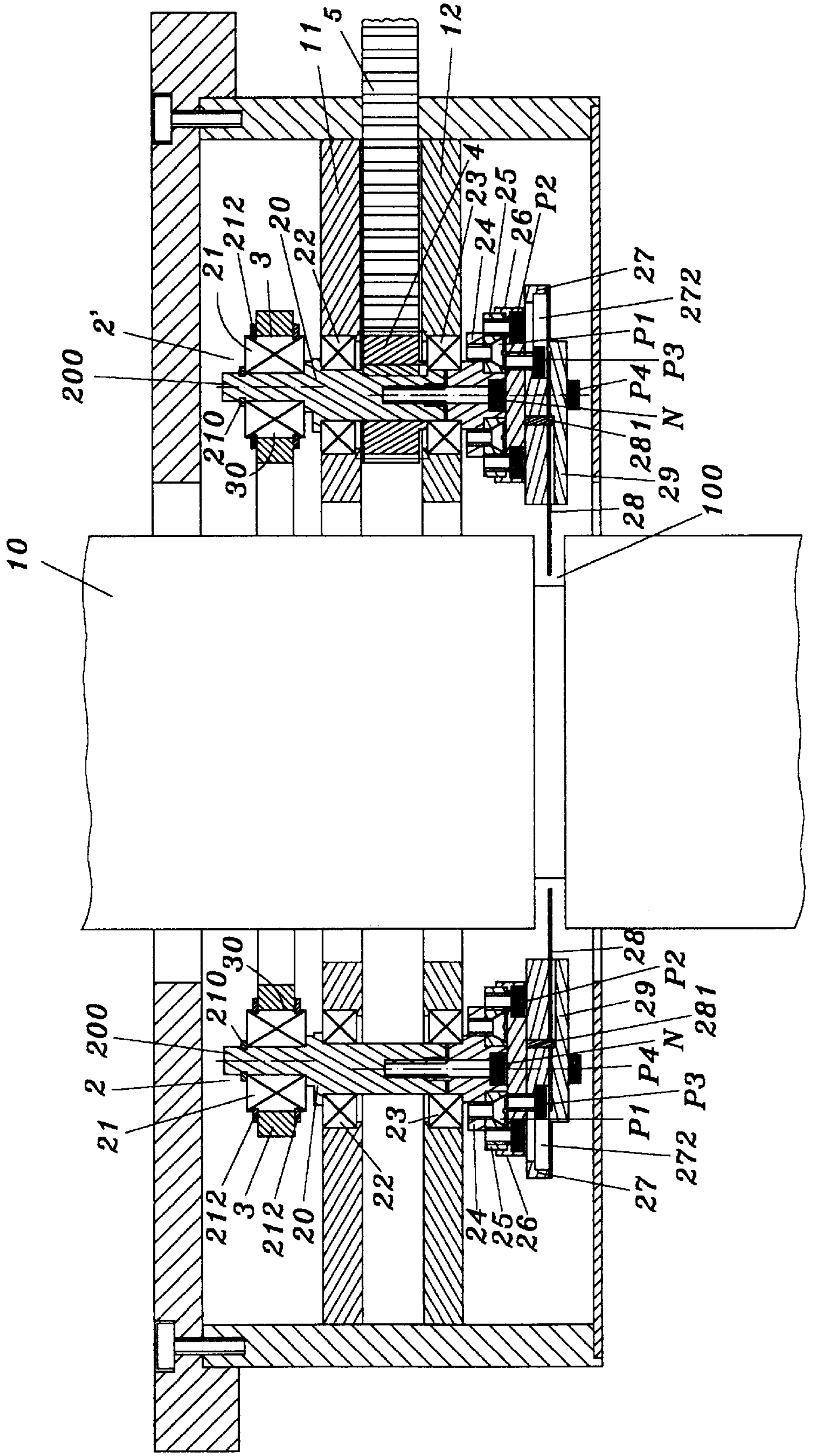
FIG. 2 is a side view in section in an enlarged scale of the thermo-shrinking film cutting mechanism according to the present invention.
Figure 3:
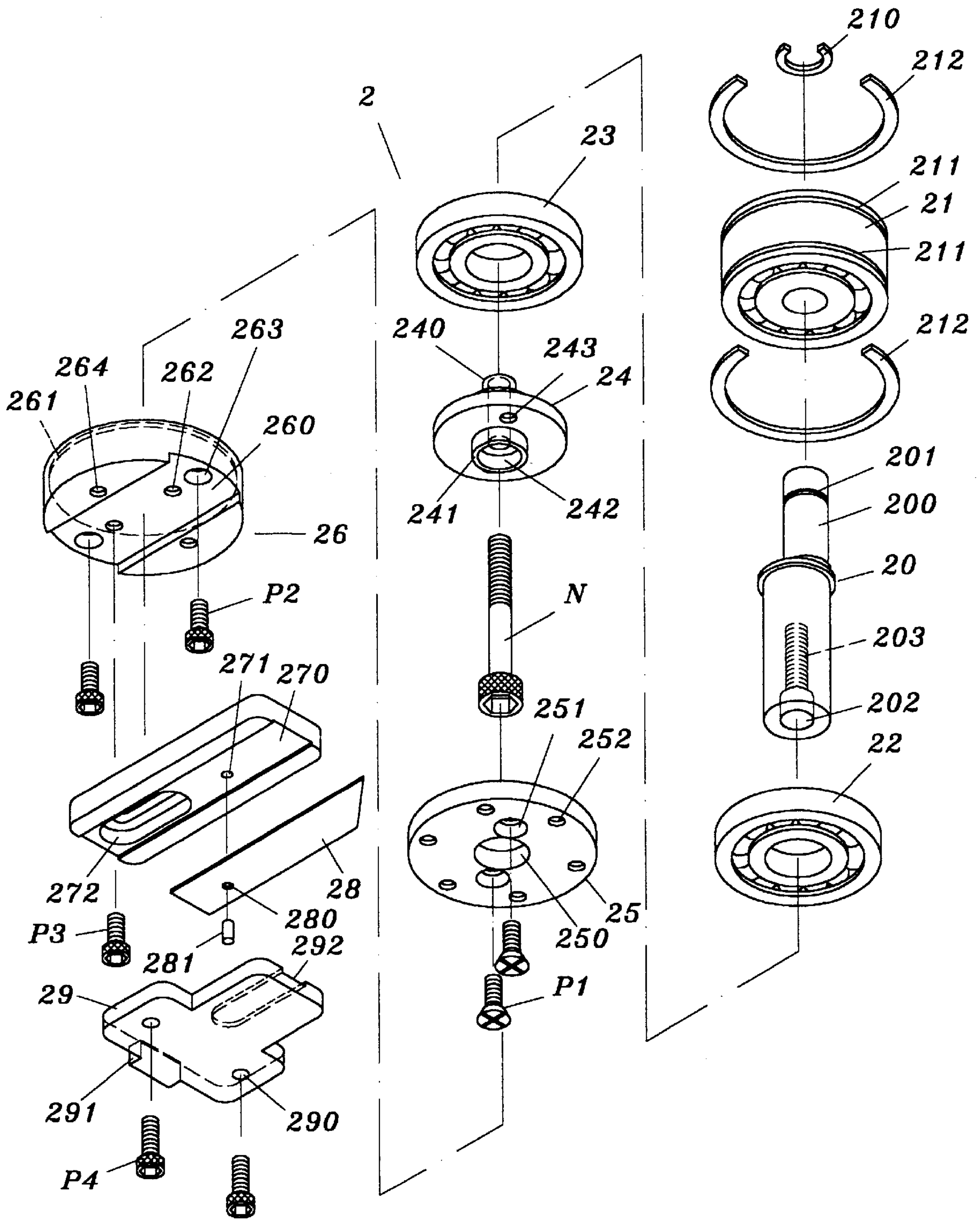
FIG. 3 is an exploded view of a cutter unit for a thermo-shrinking film cutting mechanism according to the present invention.
Figure 4:
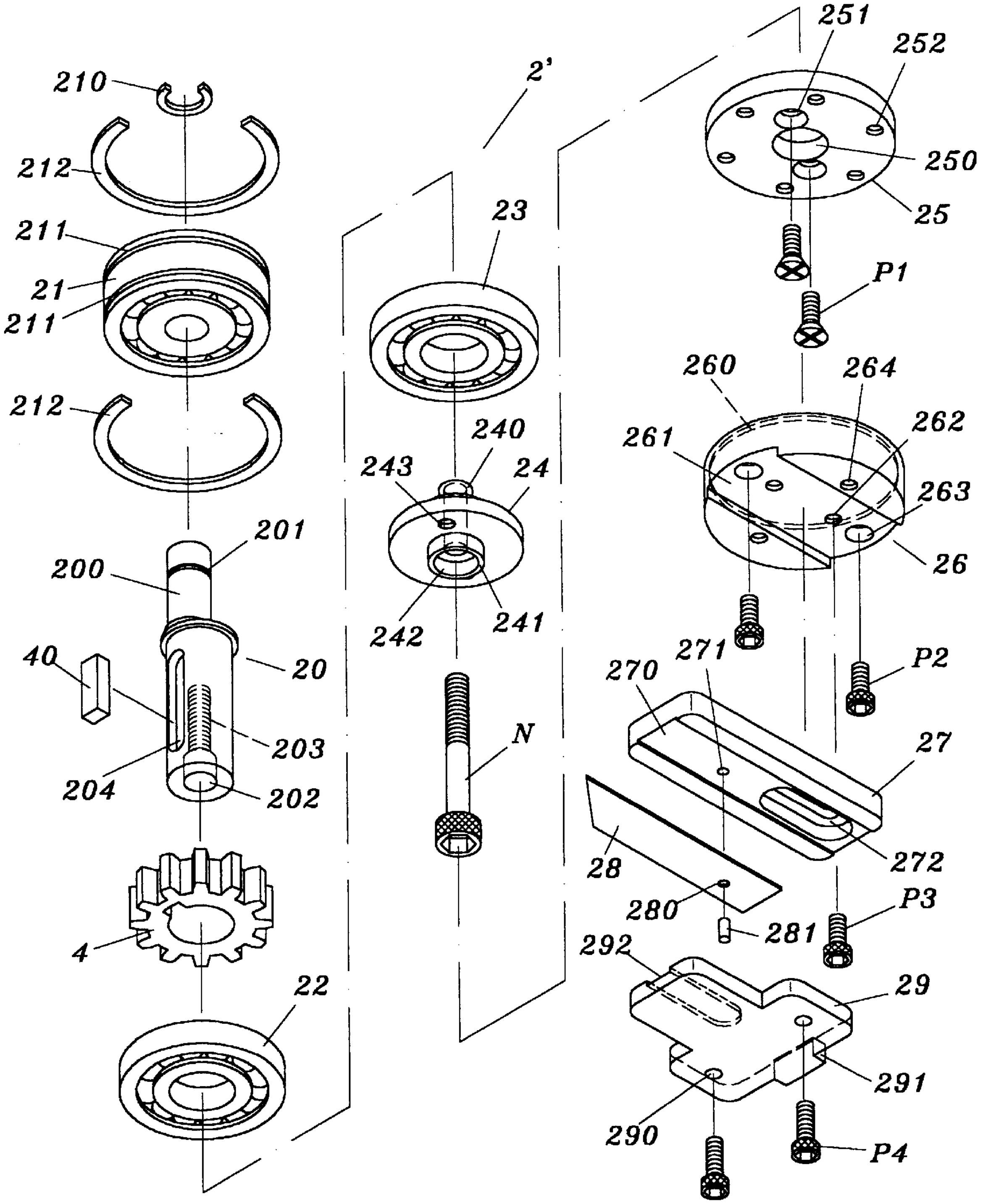
FIG. 4 is similar to FIG. 3 but showing the transmission wheel included.
Figure 5:
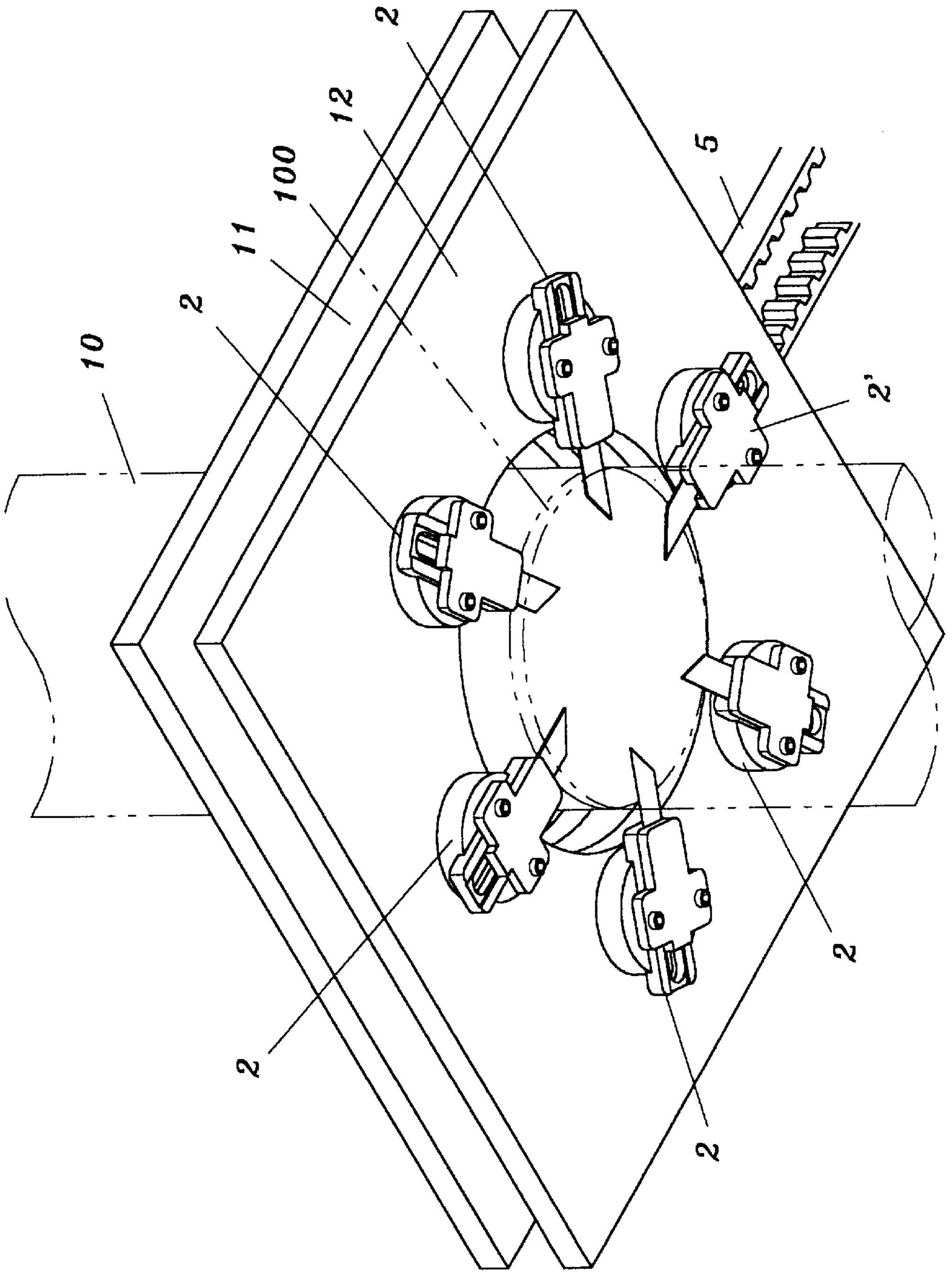
FIG. 5 is a perspective view of the thermo-shrinking film cutting mechanism according to the present invention.

Referring to FIG. 2, two locating frames 11;12 are mounted around a center guide shaft 10 at different elevations to hold a plurality of equiangularly spaced cutter units 2. A transmission disk 3 is coupled to the cutter units 2. The transmission disk 3 comprises a plurality of equiangularly spaced receiving holes 30. A transmission wheel 4 is mounted on one cutter unit 2'. A transmission belt 5 is coupled to the transmission wheel 4. When the transmission belt 5 is driven to rotate the transmission wheel 4, the transmission disk 3 is driven to turn the cutter units 2, causing the cutter units 2 to perform a cut operation. The cutter units 2;2' (see FIGS. 3 and 4) each comprise a crank shaft 20, three axle bearings namely the first axle bearing 21, the second axle bearing 22 and the third axle bearing 23, a coupling plate 24, an index plate 25, a locating plate 26, a cutter holder 27, a cutter blade 28, and a clamping plate 29. The crank shaft 20 comprises an eccentric upper section 200, an annular groove 201 around the eccentric upper section 200, a recessed bottom hole 202 at the center of the bottom edge thereof, and a longitudinal center screw hole 203 extended from the recessed bottom hole 202. The first axle bearing 21 is mounted around the eccentric upper section 200. A C-shaped clamping ring 210 is fastened to the annular groove 201 on the eccentric upper section 200 of the crank shaft 20 to secure the first axle bearing 21 to the eccentric upper section 200 of the crank shaft 20. The first axle bearing 21 comprises two annular grooves 211 around the periphery at different elevations. Two C-shaped clamping rings 212 are fastened to the annular grooves 211 to secure the first axle bearing 21 to one receiving hole 30 in the transmission disk 3 (see FIG. 2). The second axle bearing 22 and the third axle bearing 23 are respectively mounted on the locating frames 11;12 around the crank shaft 20. The coupling plate 24 is connected to the crank shaft 20 below the third axle bearing 23 by a screw bolt N. The coupling plate 24 comprises a center countersunk hole 242, a first tubular flange 240 raised from the top side thereof around the center countersunk hole 242 and fitted into the recessed bottom hole 202 on the crank shaft 20, a second tubular flange 241 raised from the bottom side thereof around the center countersunk hole 242, and two bottom screw holes 243. The screw bolt N is mounted in the countersunk hole 242 on the coupling plate 24, and threaded into the screw hole 203 in the crank shaft 20. The index plate 25 is fastened to the coupling plate 24 at the bottom side. The index plate 25 comprises a center through hole 250, two countersunk holes 251 respectively connected to the bottom screw holes 243 on the coupling plate 24 by a respective screw P1, and a plurality of screw holes 252 equiangularly spaced around the border of the bottom side thereof. The number of the screw holes 252 is equal to the number of the cutter units 2, so that the cutter blades 28 of the cutter units 2 can be arranged at different angles. The locating plate 26 is fastened to the index plate 25 at the bottom side by screws P2. The locating plate 26 comprises a top recess 260 which receives the index plate 25, a transverse bottom groove 261 at the bottom side thereof, two first screw holes 262 and two countersunk holes 263 at the transverse bottom groove 261, and two second screw holes 264 at the bottom side outside the transverse bottom groove 261. The screws P2 are mounted in the countersunk holes 263, and respectively threaded into two screw holes 252 on the index plate 25. The cutter holder 27 is fastened to the transverse bottom groove 261 of the locating plate 26 by an adjustment screw P3. The cutter holder 27 comprises a recessed bottom chamber 270, a through hole 271 and a stepped sliding hole 272 inside the recessed bottom chamber 270. The adjustment screw P3 is mounted in the stepped sliding hole 272 on the cutter holder 27, and threaded into one first screw hole 262 on the locating plate 26. When the adjustment screw P3 is loosened, the cutter holder 27 can be moved along the transverse bottom groove 261 relative to the locating plate 26, and then fixed at the desired location. The cutter blade 28 has a through hole 280 fastened to the through hole 271 on the cutter holder 27 by a pin 281. The clamping plate 29 comprises two through holes 290 respectively fastened to the second screw holes 264 on the locating plate 26 by a respective screw P4, a stop block 291 at the rear side thereof stopped at one end of the cutter blade 28, and a front groove 292. When the cutter units 2;2' are installed in the locating frames 11;12, the cutter blades 18 are aimed at an annular groove 100 around the periphery of the center guide shaft 10 (see FIGS. 2 and 5). The transmission wheel 4 is mounted on the crank shaft 20 of the cutter unit 2', and secured thereto by a key 40 (see FIG. 4). The crank shaft 20 of the cutter unit 2' has a key way 204 which receives the key 40.

Figure 6:
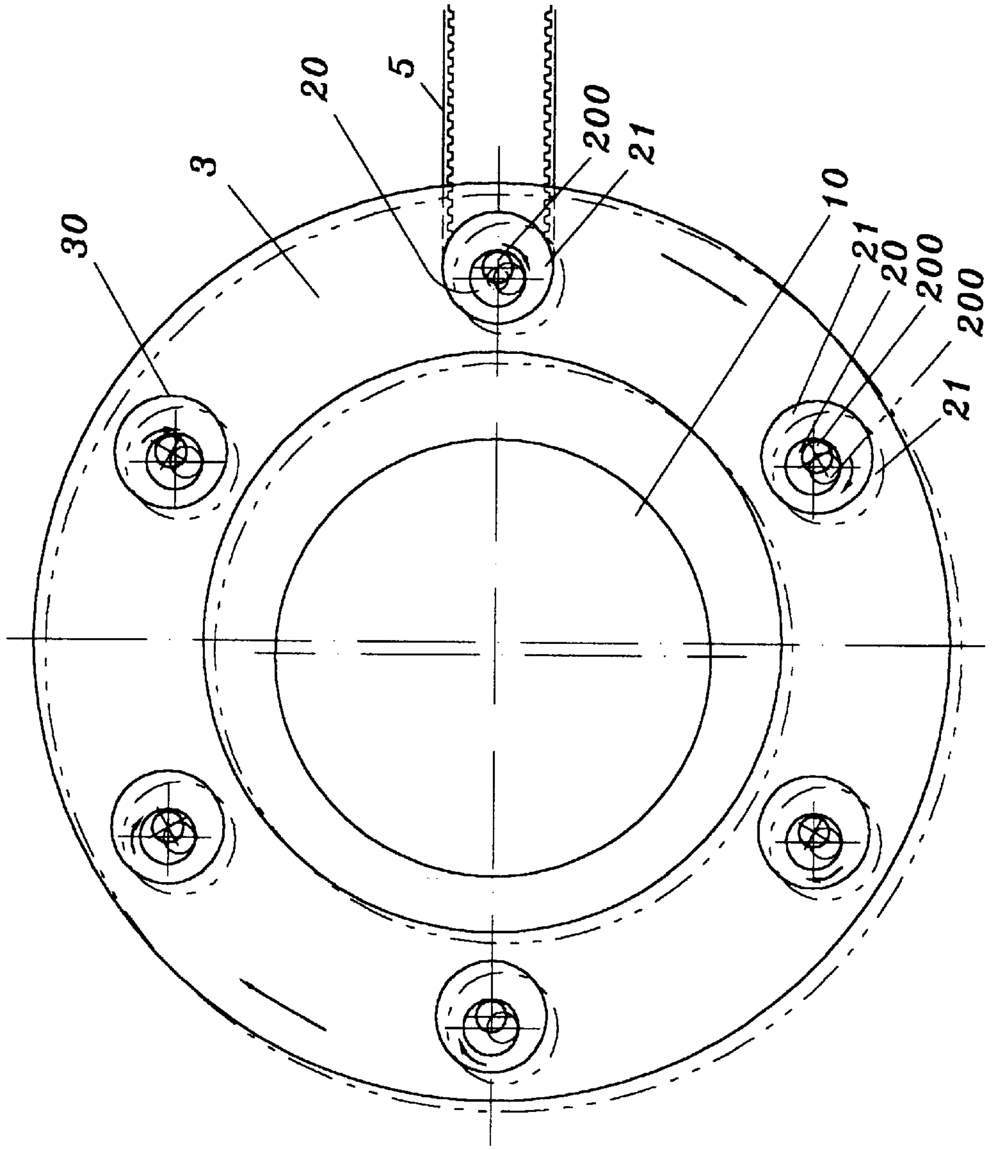
FIG. 6 is a schematic drawing showing the transmission disk rotated, the cutter units turned according to the present invention.
Figure 7:
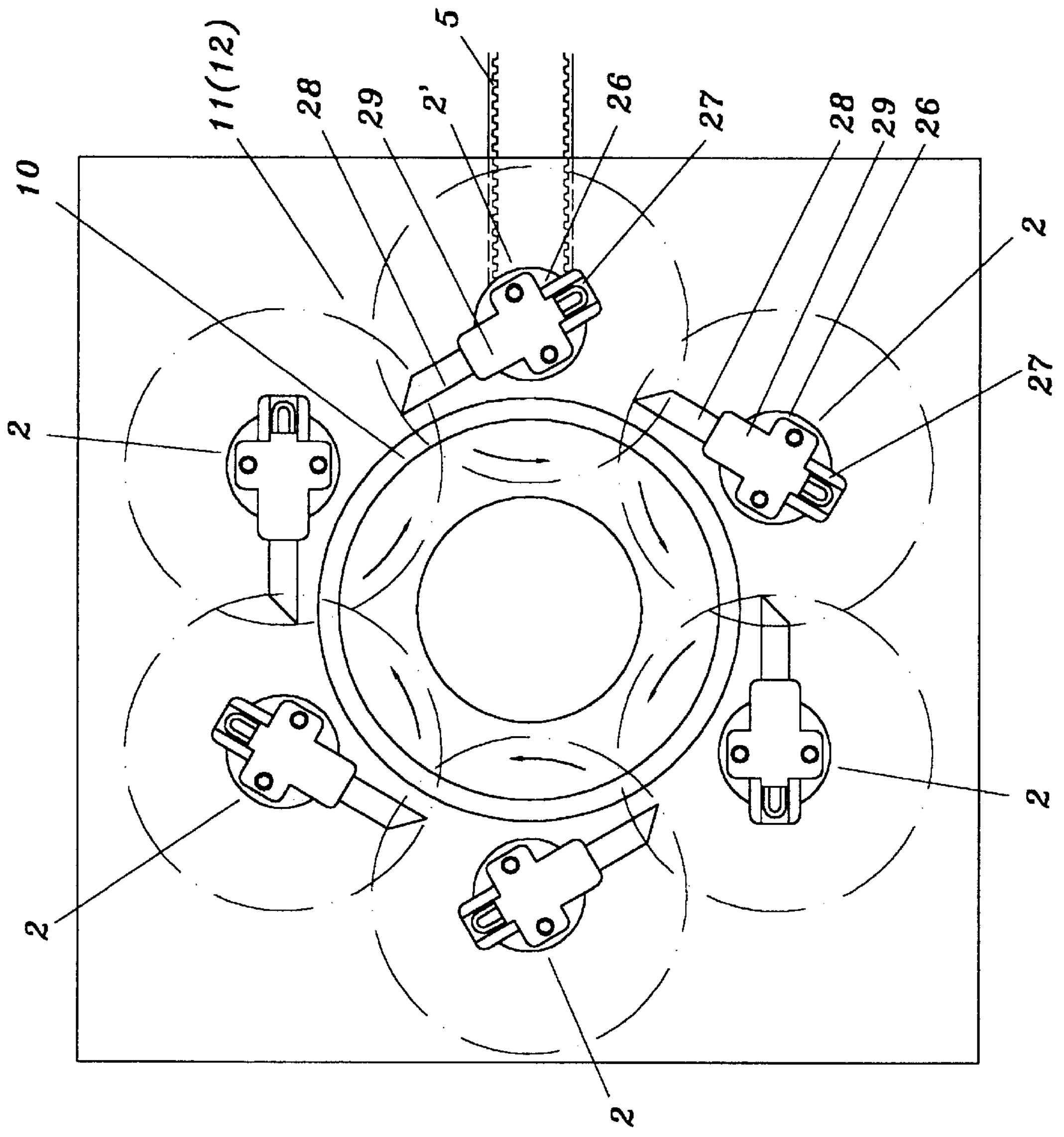
FIG. 7 is a bottom plain view of the present invention, showing the thermo-shrinking film cutting mechanism operated.
Figure 8:
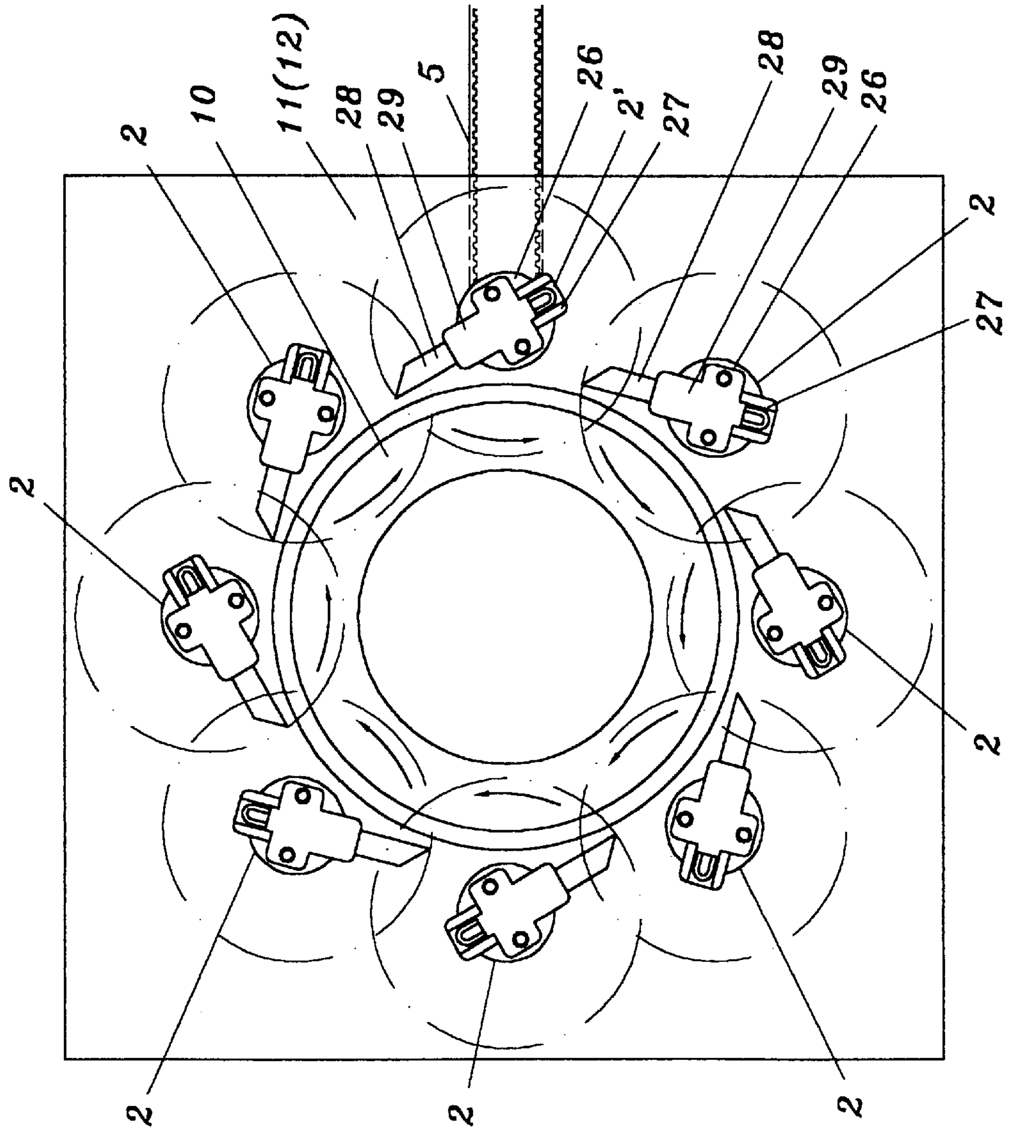
FIG. 8 is an applied view of the present invention, showing eight sets of cutter units installed.

Referring to FIGS. from 6 to 8, when the transmission wheel 4 is turned by the transmission belt 5, the crank shaft 20 of the cutter unit 2' is rotated with the transmission wheel 4. Because the eccentric upper sections 200 of the crank shafts 20 of the cutter units 2;2' are coupled to the transmission disk 3, the transmission disk 3 is driven to rotate the cutter units 2 when the eccentric upper section 200 of the crank shaft 20 of the cutter unit 2' is turned (see FIG. 6), and therefore the cutter units 2;2' are synchronously turned to cut the thermo-shrinking film (see FIGS. 7 and 8). The number of the cutter units 2 can be 4, 5, 6, 7, 8, . . . etc. In FIG. 7, there are 6 cutter units 2 installed. In FIG. 8, the thermo-shrinking film cutting mechanism includes 8 cutter units 2.

As indicated above, when the adjustment screw P3 is loosened, the cutter holder 27 can be moved along the transverse bottom groove 261 relative to the locating plate 26 to adjust the position of the cutter blade 28 subject to the size of the thermo-shrinking film and the diameter of the center guide shaft 10.

Figure 9:
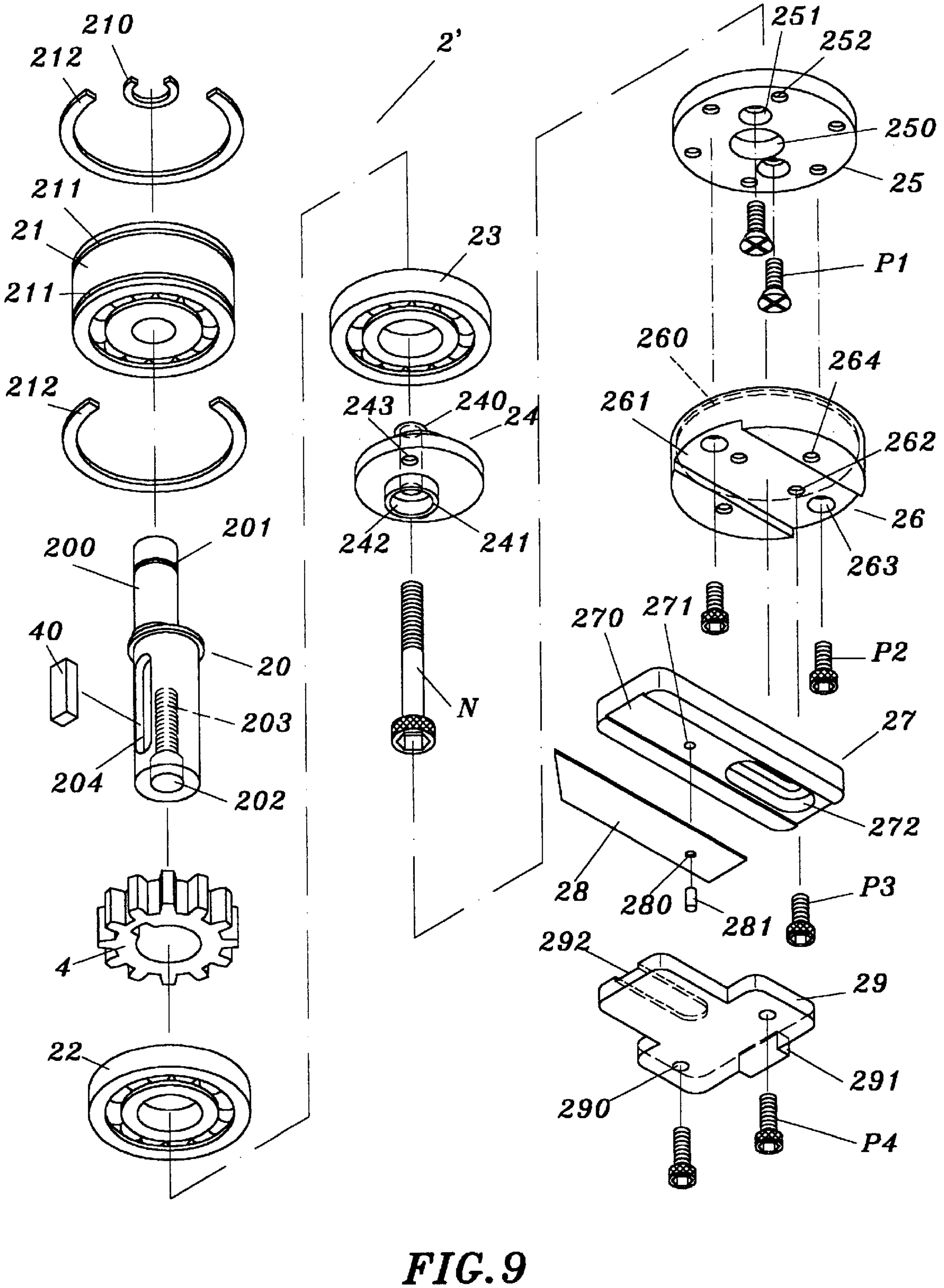
FIG. 9 is an exploded view of an alternate form of the present invention.
Figure 10:
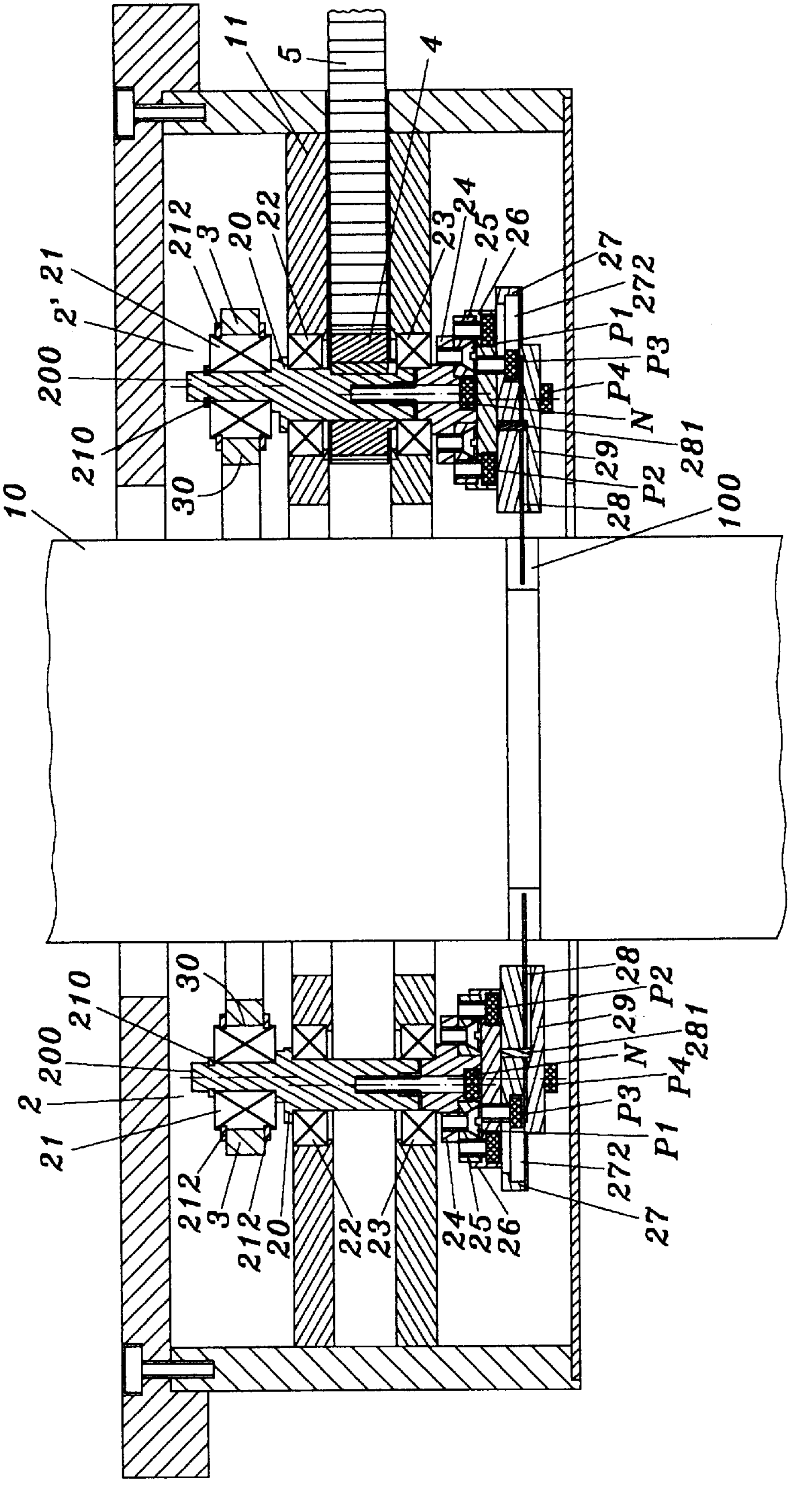
FIG. 10 is a sectional assembly view of the alternate form shown in FIG. 9.

FIGS. 9 and 10 show an alternate form of the present invention. According to this alternate form, the countersunk hole 242 of the coupling plate 24 is disposed at an eccentric location, therefore the index plate 25, the locating plate 26, the cutter holder 27 and the clamping plate 29 are arranged at an eccentric location relative to the crank shaft 200 (see FIG. 10). When the crank shaft 200 is rotated, the cutter blade 28 is turned eccentrically to rapidly and accurately cut the thermo-shrinking film.

It is to be understood that the drawings are designed for purposes of illustration only, and are not intended as a definition of the limits and scope of the invention disclosed.

What the invention claimed is:

1. A thermo-shrinking film cutting echanism comprising a center guide shaft, two locating frames mounted around said center guide shaft at different elevations, a plurality of cutter units mounted on said locating frames and equiangularly spaced around said center guide shaft, and a transmission mechanism driven to rotate said cutter units, causing said cutter units to cut a thermo-shrinking film, wherein:

said transmission mechanism comprises a transmission disk revolvably mounted around said center guide shaft above said locating frames and coupled to said cutter units, said transmission disk comprising a plurality of equiangularly spaced receiving holes, a transmission wheel fixedly mounted on one cutter unit, and a transmission belt coupled to said transmission wheel and driven to rotate said transmission wheel, causing said cutter units to be synchronously rotated.

said cutter units each comprise a crank shaft, said crank shaft having a shaft body supported in axle bearings in said locating frames and an eccentric upper section raised from said shaft body and supported in an axle bearing mounted in one receiving hole on said transmission disk, an index plate having a plurality of screw holes equiangularly spaced at a bottom side thereof, a coupling plate connected between the shaft body of said crank shaft and said index plate, a locating plate fixedly fastened to the bottom side of said index plate, said locating plate having a transverse bottom groove and two countersunk holes disposed in said transverse bottom groove and selectively fastened to the screw holes on said index plate by a respective screw at the desired angle, a cutter holder fastened to the transverse bottom groove of said locating plate by an adjustment screw, said cutter holder having a stepped sliding hole through which said adjustment screw is threaded into a screw hole in the transverse bottom groove of said locating plate, a cutter blade fastened to said cutter holder, and a clamping plate fastened to said locating plate to hold said cutter holder and said cutter blade in place.

2. The thermo-shrinking film cutting mechanism of claim 1 wherein the number of the screw holes on said index plate is proportional to the number of said cutter units.

3. The thermo-shrinking film cutting mechanism of claim 1 wherein said coupling plate is eccentrically connected to the shaft body of said crank shaft, enabling said index plate, said locating plate, said cutter holder and said clamping plate to be disposed at an eccentric location relative to the shaft body of said crank shaft.

* * * * *